United States Patent
Wagner et al.

(10) Patent No.: US 10,195,921 B2
(45) Date of Patent: Feb. 5, 2019

(54) VEHICLE AIR CONDITIONING SYSTEM

(71) Applicant: Nissan North America, Inc., Franklin, TN (US)

(72) Inventors: James Wagner, Novi, MI (US); Norbert Weinert, Troy, MI (US)

(73) Assignee: Nissan North America, Inc., Franklin, TN (US)

( * ) Notice: Subject to any disclaimer, the term of this patent is extended or adjusted under 35 U.S.C. 154(b) by 115 days.

(21) Appl. No.: 15/188,332

(22) Filed: Jun. 21, 2016

(65) Prior Publication Data

US 2017/0361678 A1 Dec. 21, 2017

(51) Int. Cl.
*B60H 1/00* (2006.01)

(52) U.S. Cl.
CPC ..... *B60H 1/00764* (2013.01); *B60H 1/00849* (2013.01)

(58) Field of Classification Search
CPC combination set(s) only.
See application file for complete search history.

(56) References Cited

U.S. PATENT DOCUMENTS

| | | | |
|---|---|---|---|
| 5,725,425 A | 3/1998 | Rump et al. | |
| 8,092,285 B2 * | 1/2012 | Mathur | B60H 1/00764 454/75 |
| 2010/0144261 A1 | 6/2010 | Barkic et al. | |
| 2010/0190429 A1 | 7/2010 | Dage | |
| 2012/0009859 A1 * | 1/2012 | Wijaya | B60H 1/00764 454/75 |

FOREIGN PATENT DOCUMENTS

| | | | | |
|---|---|---|---|---|
| DE | 1414594 A1 | 11/1995 | | |
| EP | 1422089 B1 | 3/2008 | | |
| WO | WO 2012050508 A1 * | 4/2012 | | B60H 1/00764 |

* cited by examiner

*Primary Examiner* — Gregory L Huson
*Assistant Examiner* — Elizabeth M. May
(74) *Attorney, Agent, or Firm* — Global IP Counselors, LLP

(57) ABSTRACT

A vehicle air conditioning system includes an air handler and a controller. The air handler defines a fresh air inlet, air outlets that directs air into a passenger compartment and a recirculation inlet that draws air from the passenger compartment into the air handler. The air handler operates in a fresh air mode and a recirculation mode. In the fresh air mode fresh air enters the air handler through the fresh air inlet and in the recirculation mode fresh air is prevented from entering the air handler, and instead air enters the air handler via the recirculation inlet. The controller switches the air handler to operate in the recirculation mode in response to determining the following: a diesel engine is operating in a regeneration mode and the air handler is in the fresh air mode.

7 Claims, 5 Drawing Sheets

VEHICLE AIR CONDITIONING SYSTEM

BACKGROUND

Field of the Invention

The present invention generally relates to an air conditioning system (AC system) for a vehicle having a diesel engine. More specifically, the present invention relates to an AC system that can automatically change air flow of the AC system to a recirculation mode when the diesel engine is operating in a regeneration mode.

Background Information

Modern diesel engines usually include a particulate collecting mechanism (also referred to as a particulate or soot filter) that collects particulate matter (also referred to as ash or soot) during normal operation of the diesel engine. Depending upon driving habits, the particulate collecting mechanism requires occasion cleaning in a process known as regeneration. The regeneration operation sometimes produces exhaust gases that can be unpleasant to some vehicle passengers.

SUMMARY

One object of the present disclosure is to provide a vehicle air conditioning system (AC system) in a vehicle powered by a diesel engine, that automatically switches operation of an air handler to a recirculation mode in response to determining that a diesel engine of the vehicle is operating in a regeneration mode where the particulate collecting mechanism is being cleansed.

In view of the state of the known technology, one aspect of the present disclosure is to provide a vehicle with an air conditioning system and a diesel engine. The diesel engine is installed within an engine compartment of the vehicle. The engine is operable in a first operating state and second operating state that differs from the first operating state. The air conditioning system includes an air handler within the vehicle. The air handler defines a fresh air inlet configured to draw fresh air into the air handler from outside the vehicle body structure, a plurality of air outlets configured to direct air out of the air handler into the passenger compartment and a recirculation inlet configured to draw air from within the passenger compartment into the air handler. The air handler is configured to operate in a fresh air mode and a recirculation mode, such that in the fresh air mode fresh air enters the air handler through the fresh air inlet and in the recirculation mode fresh air is prevented from entering the air handler and air instead enters the air handler via the recirculation inlet. A controller of the air conditioning system is coupled to the engine and the air handler. The controller is configured to switch the air handler to operate in the recirculation mode in response to determining the following: 1) the engine has switched from operating in the first operating state to operating in the second operating state; and 2) the air handler is currently operating in the fresh air mode.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
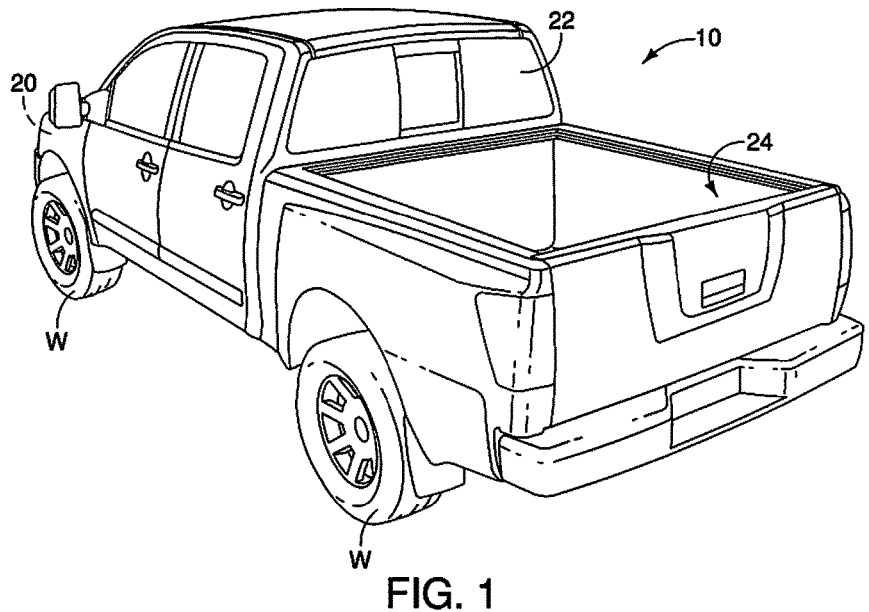
FIG. 1 is a perspective view of a vehicle that is powered by a diesel engine in accordance with a first embodiment.
Figure 2:
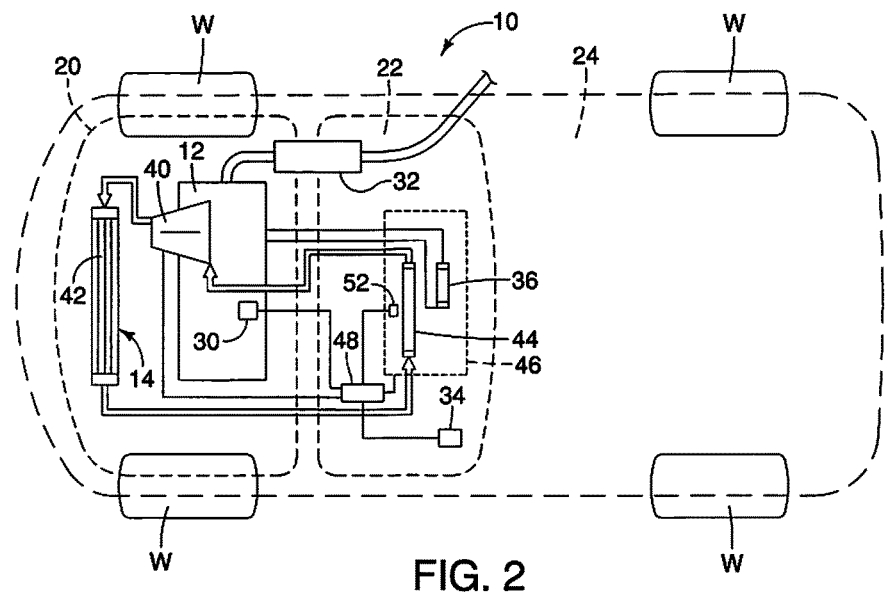
FIG. 2 is a schematic overhead view of the vehicle depicted in FIG. 1, showing the diesel engine having a particulate collecting mechanism and an air conditioning system with an air handler in accordance with the first embodiment.

Referring initially to FIGS. 1 and 2, a vehicle 10 is illustrated in accordance with a first embodiment. The vehicle 10 includes a diesel engine 12 and an air conditioning system 14 that is described in greater detail below, after a brief description of the vehicle 10 and the diesel engine 12 and related features of the diesel engine 12.

The vehicle 10 is depicted in FIG. 1 as having a vehicle body structure that defines, for example, a pickup truck. However, the vehicle 10 can alternatively have a vehicle body structure that defines a sports utility vehicle (SUV), a commercial van, a passenger vehicle, or any other vehicle design that can benefit from being powered by a diesel engine, such as the diesel engine 12. The vehicle 10 depicted in FIGS. 1 and 2 includes an engine compartment 20, a passenger compartment 22 and cargo area 24. The diesel engine 12 is installed within the engine compartment 20 of the vehicle 10 in a conventional manner. The diesel engine 12 includes a transmission (not illustrated) that is configured to receive rotary power (torque) from the diesel engine 12 and selectively transmit that rotary power to at least two of the wheels W of the vehicle 10. However, it should be understood from the drawings and the description herein that rotary power can be transmitted to all four wheels W. In other words, the vehicle 10 can be either a two-wheel drive vehicle or a four-wheel drive vehicle.

The diesel engine 12 basically includes, among other features and components, a diesel engine controller 30 and a particulate collecting mechanism 32 (also referred to as a particulate filter). The diesel engine controller 30 is further connected to a display and a control panel 34 (FIG. 3) within the passenger compartment 22 of the vehicle 10. The diesel engine 12 has a cooling system (not shown) with a coolant temperature sensor 35 and a heater core 36 that can provide heat to the passenger compartment 22. The diesel engine controller 30 includes circuitry connected to a variety of conventional sensors associated with the diesel engine 12, such as an exhaust gas pressure sensor 37, an exhaust gas temperature sensor 38, and a fuel injector 39 configured to inject fuel into the diesel engine exhaust and enter the particulate collecting mechanism 32 in a manner described further below.

A description of the particulate collecting mechanism 32 of the diesel engine 12 is now provided. The particulate collecting mechanism 32 is directly connected to the diesel engine 12 via an exhaust pipe or manifold such that exhaust flows directly out of the diesel engine 12 and into the particulate collecting mechanism 32. The fuel injector 39 is installed in the exhaust pipe of the diesel engine 12, downstream of the diesel engine 12, and upstream of the particulate collecting mechanism 32.

The particulate collecting mechanism 32 includes a series of chambers that are configured to process and reduce unwanted emissions from the exhaust gases produced by the diesel engine 12. During operation of the diesel engine 12, particulate matter collects on interior walls (not shown) of at least one of the chambers of the particulate collecting mechanism 32. The particulate matter is also referred to as soot or ash that builds up over time within the particulate collecting mechanism 32. The particulate matter must occasionally be eliminated from the particulate collecting mechanism 32. The particulate matter can be oxidized thereby removing it from the particulate collecting mechanism 32 in any of a plurality of regeneration processes that are described in greater detail below. Since particulate collecting mechanisms are well known, further description of the particulate connecting mechanism 32 is omitted for the sake of brevity.

For purposes of understanding the operations of the air conditioning system 14, the diesel engine 12 is characterized as being operable in at least two modes of operation: a first operating state and a second operating state. The first operating state corresponds to normal day-to-day driving operations, which can include urban stop and go traffic or highway driving. The second operating state is any of a plurality of regeneration modes that are described in greater detail below.

One of the plurality of regeneration modes (the second operating state) is referred to as a passive regeneration process. Specifically, when the diesel engine 12 is operated such that the exhaust gases achieve and maintain a predetermined temperature as measured by the exhaust temperature sensor 35, the particulate collecting mechanism 32 undergoes self-regeneration, aka, the passive regeneration process. Specifically, when the diesel engine 12 is operated for an extended period of time during which the predetermined exhaust gas temperature is maintained or surpassed, the elevated temperatures cause the particulate collecting mechanism 32 to oxidize and consume the collected particulate matter therein. In other words, under certain operating conditions, the particulate collecting mechanism 32 is automatically and often continuously cleaned itself with no action required by a vehicle operator or the diesel engine controller 30. For example, when the vehicle 12 is taken on the highway and driven at highway speeds for a minimum of 20 minutes without dropping speed below 5 MPH, or is driven with the vehicle carrying heavy loads for an extended period of time, once the exhaust gases from the diesel engine 12 heat the particulate collecting mechanism 32 to the predetermined temperature, the particulate collecting mechanism 32 automatically regenerates (consumes particulate matter or soot) simply due to the prolonged passing of high temperature exhaust gases through the particulate collecting mechanism 32. Since the diesel engine controller 30 monitors the temperatures measured by the exhaust gas temperature sensor 38, the diesel engine controller 30 can monitor the duration of the passive regeneration process and determine the amount of particulate matter that has been oxidized and consumed.

Depending upon the vehicle, the passive regeneration process typically begins when the temperature of exhaust gas entering the particulate collecting mechanism 32 is at or above 316° C. (601° F.). This temperature is a predetermined minimum regeneration temperature and is achieved during prolonged highway driving (for example, more than 20 minutes) or driving with heavy loads for an extended period of time. No fuel is injected into the exhaust gases entering the particulate collecting mechanism 32 by the diesel engine controller 30 during passive regeneration.

When the vehicle 12 is used for short drives, or in slow traffic for a prolonged period of time, the particulate matter build up in the particulate collecting mechanism 32 must eventually be eliminated. The diesel engine controller 30 monitors the temperature of the exhaust gases entering the particulate collecting mechanism 32 via the exhaust gas temperature sensor 38. If the exhaust gas temperatures fail to achieve the predetermined minimum regeneration temperature over a prolonged period of time, as monitored by the diesel engine controller 30, the diesel engine controller 30 can determine whether or not an active regeneration process is necessary to remove particulate matter from the particulate collecting mechanism 32.

Alternatively, the diesel engine controller 30 can monitor the exhaust gas pressure via the exhaust gas pressure sensor 37 entering the particulate collecting mechanism 32. If the exhaust gas pressure upstream of the particulate collecting mechanism 32 is above a predetermined pressure, the high pressure indicated a need for an active regeneration process. If the exhaust gas pressure is greater than a predetermined amount, the diesel engine controller 30 can determine that an active regeneration process is needed for the particulate collecting mechanism 32.

There are at least two possible active regeneration processes. The active regeneration processes differ from vehicle to vehicle. However, in the depicted embodiment, a first active regeneration process occurs when the diesel engine controller 30 determines that the exhaust temperatures have not achieved regeneration temperature for a predetermined length of time, or when the diesel engine controller 30 determines that the back pressure from the particulate collecting mechanism 32 is high indicating a large amount of particulate matter therein, indicating that active regeneration is necessary.

The diesel engine controller 30 can determine whether or not the regeneration process needs to be conducted. Specifically, the diesel engine controller 30 can automatically begin the first active regeneration process when the vehicle 10 is being operated (driven). Alternatively, since the diesel engine controller 30 is connected to the display and control panel 34 and can illuminate the display of the control panel 34 providing the vehicle operator with the option of pressing a switch (not shown) of the display and control panel 34 to begin the first active regeneration process.

In the first active regeneration process, the diesel engine controller 30 injects fuel directly into the exhaust gases entering the particulate collecting mechanism 32 via the fuel injector 39. The injected fuel begins burning within the particulate collecting mechanism thereby oxidizing and consuming the particulate matter buildup while driving. The driving capabilities of the vehicle 10 are not impacted during this first active regeneration process. This process is sometimes referred to as after treatment injection. The injected fuel is consumed (oxidized) within the particulate collecting mechanism 32. The oxidation of this additional fuel raises the temperature within the particulate collecting mechanism 32 to a level at or above the predetermined minimum regeneration temperature described above, thereby generating sufficient heat to start the regeneration process.

There is a second active regeneration process, referred to as parking regeneration or stationary regeneration process. When the diesel engine controller 30 determines that a regeneration process needs to be conducted, the diesel engine controller 30 causes the display and control panel 34 to illuminate and provide the vehicle operator with the option of pressing another switch (not shown) of the display and control panel 34 to begin the stationary regeneration process.

In the stationary regeneration process, the vehicle 10 is parked and is not driven. It is up to the vehicle operator to start the stationary regeneration process. Once the vehicle operator has selected the stationary regeneration process, the diesel engine controller 30 starts and operates the diesel engine 12 to generate conditions that bring the temperature of the exhaust gas entering the particulate collecting mechanism 32 to the predetermined regeneration temperature. In the stationary regeneration process, it is possible for the diesel engine controller 30 to inject fuel via the fuel injector 39 directly into the exhaust gases entering the particulate collecting mechanism 32 in order to initiate the process of oxidizing and consuming the particulate matter buildup. Basically, in the stationary regeneration process, the diesel engine's RPM's increase to 1500. The particulate collecting mechanism 32 can maintain the diesel engine's RPM's at this level until the temperature of the particulate collecting mechanism 32 reaches the predetermined regeneration temperature. The diesel engine's RPMs are thereafter controlled by the diesel engine controller 30 to maintain the predetermined regeneration temperature until the regeneration process is completed (about 20 to 40 minutes).

Regardless of which regeneration process is used, the diesel engine controller 30 is configured to monitor the status and progress of the regeneration process.

A description of the air conditioning system 14 is now provided with initial reference to FIGS. 2-5. As shown in FIG. 2, the air conditioning system 14 includes at least the following: a compressor 40, a condenser 42, an evaporator 44, an air handler 46 and a controller 48. The compressor 40 and the condenser 42 are located within the engine compartment 20. The compressor 40 is mounted on the diesel engine 12 receiving rotary power therefrom in a conventional manner, such as via a pulley/belt arrangement. Since compressors and evaporators are conventional components of air conditioning systems, further description is omitted for the sake of brevity.

The air handler 46 is at least partially located within the passenger compartment 22 of the vehicle 10 as shown in FIG. 2, with the heater core 36 and the evaporator 44 being disposed within the air handler 46 to heat or cool air flowing therethrough in a conventional manner.

The air handler 46 is described further below with specific reference to FIGS. 4 and 5, following a description of the controller 48.

Figure 3:
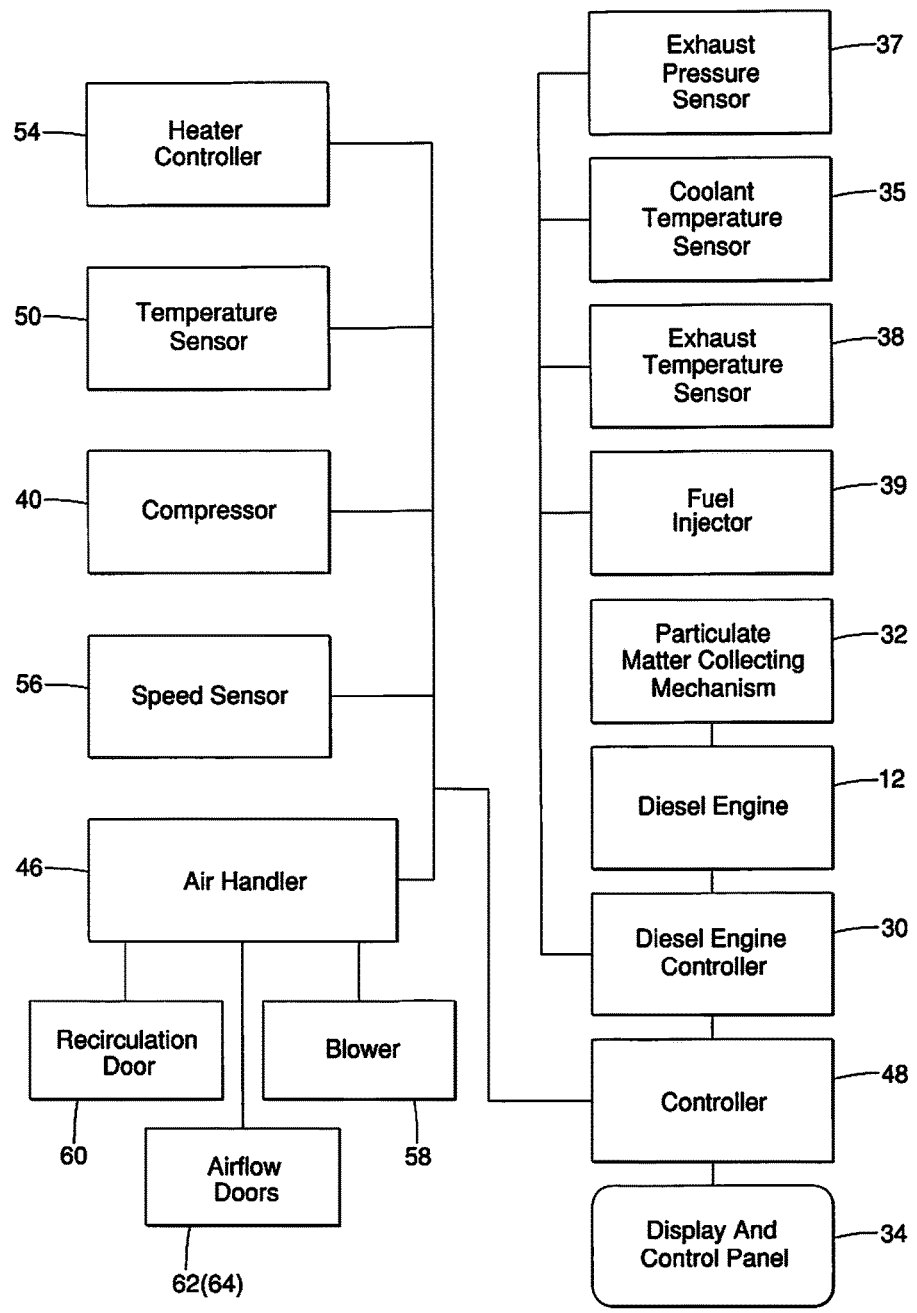
FIG. 3 is a block diagram showing the diesel engine, a diesel engine controller, the air conditioning system, a controller of the air conditioning system and the air handler in accordance with the first embodiment.

As shown in FIG. 2, the controller 48 is connected to the diesel engine controller 30 of the diesel engine 12, the compressor 40, the air handler 46, and a temperatures sensor 50 within the air handler 46. As shown in FIG. 3, the controller 48 is further connected to a heater control 54, a speed sensor 56, a blower 58, a recirculation door 60 within the air handler 46, and the display and control panel 34.

The controller 48 is depicted in the drawings as being a separate element from the diesel engine controller 30. However, it should be understood from the drawings and the description herein that the diesel engine controller 30 and the controller 48 can be one and the same component of the vehicle 10. Specifically, only a single controller can be provide to the vehicle 10, where the single controller includes operating circuitry and/or programming configured to perform all the functions and operations described herein relating to the diesel engine controller 30 and can include operating circuitry and/or programming configured to perform all the functions and operations described herein relating to the controller 48.

The controller 48 is configured to control heating and cooling functions of the air conditioning system 14 in a conventional manner. For example, the amount of air directed through the heater core 36 within the air handler 46 is effected by the heater controller 54 via instructions from the controller 48. The heater controller 54 can be a door (not shown) that directs air from within the air handler 46 to pass through the heater core 36 when heat is desired, and move the door (not shown) to prevent air from passing through the heater core 36 when heat is not desired or requested. Similarly, the controller 48 controls operation of the compressor 40 to provide cooling to the evaporator 44 when cooling of air flowing through the air handler 46 is required and/or requested. The controller 48 is provided with temperature measurements via the temperature sensor 50 for the control of both the heater controller 54 and the compressor 48. The display and control panel 34 can be provided with setting controls that set temperature requests (heating or cooling) in a conventional manner. Since operation of an air conditioning system to provide heating and cooling within a vehicle is conventional, further description is omitted for the sake of brevity.

The speed sensor 56 is coupled to a drive train (and the wheels W) for measuring the current speed of the vehicle 10.

Figure 4:
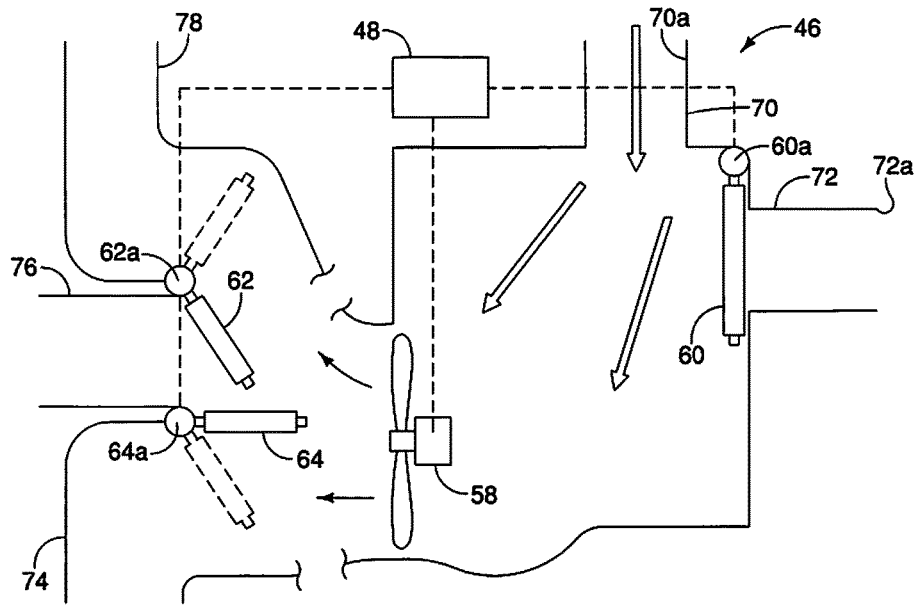
FIG. 4 is a schematic view of the air handler showing a recirculation door within the air handler in a first position blocking a recirculating air inlet preventing recirculating air from entering the air handler from the passenger compartment thereby defining a fresh air mode in which fresh air is drawn into the air handler via an exposed fresh air inlet in accordance with the first embodiment.
Figure 5:
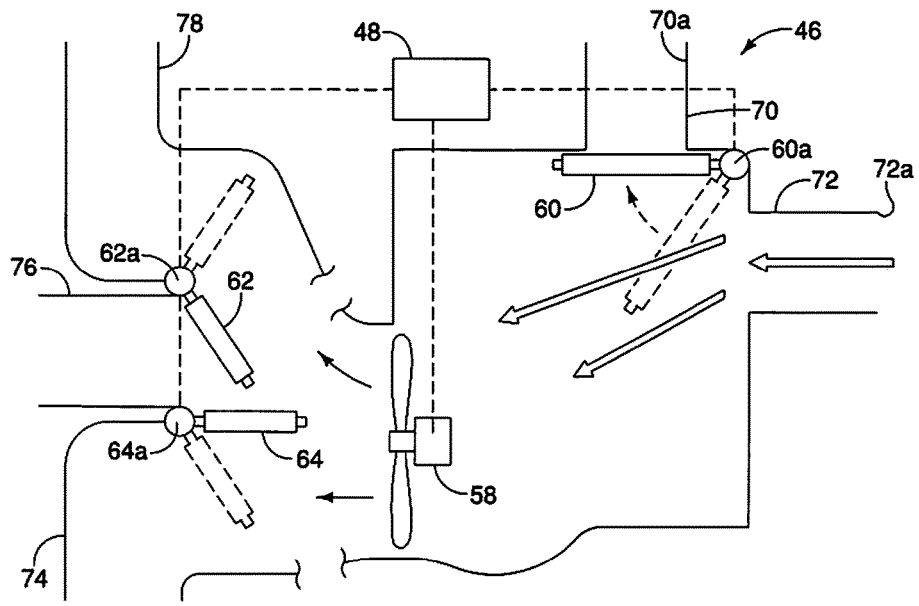
FIG. 5 is another schematic view of the air handler showing the recirculation door in a second position blocking the fresh air inlet preventing fresh air air from entering the air handler from outside the vehicle thereby defining a recirculating mode in which recirculated air is drawn into the air handler via the exposed recirculation air inlet in accordance with the first embodiment.

Schematic views of the air handler 46 are provided in FIGS. 4 and 5. For the sake of simplicity, the evaporator 44 and the heater core 36 are omitted from FIGS. 4 and 5, since their operation is not necessary for understanding the operation of the recirculation door 60 by the controller 48, as described further below. However, it should be understood from the drawings and description herein that the evaporator 44 and the heater core 36 are positioned downstream from the blower 58 in the area cut-away in FIGS. 4 and 5.

As shown in FIGS. 4 and 5, the air handler 46 includes a fresh air inlet 70, a recirculation inlet 72, a floor outlet 74, an instrument panel outlet 76, a windscreen outlet 78, the blower 58, the recirculation door 60 and the airflow doors 62 and 64.

The fresh air inlet 70 is basically a duct that is exposed to an area of the vehicle 10 such that fresh air is drawn into the air handler 46 through the fresh air inlet 70. Specifically, an open end 70a of the fresh air inlet 70 can be located at any of a variety of locations on the vehicle 10, such as a cowl portion of the front of the vehicle adjacent to the windscreen (windshield), or at a more forward location adjacent to the condenser 42.

The recirculation inlet 72 of the air handler 46 has an open end 72a that is exposed within the passenger compartment 22 such that air from the passenger compartment 22 is drawn into the air handler 46 via the open end 72a. The recirculation door 60 includes a positioning motor 60a controlled by the controller 48 to move between a fresh air mode (FIG. 4) and a recirculation mode (FIG. 5). Specifically, in the fresh air mode (FIG. 4), the recirculation door 60 is positioned by the controller 48 to block the recirculation inlet 72 such that only fresh air from the fresh air inlet 70 enters the air handler 46. In the recirculation mode (FIG. 5) the recirculation door 60 is moved by the controller 48 to block the fresh air inlet 70 such that only air from recirculation inlet 72 enters the air handler 46. Feedback signals from the positioning motor 60a of the recirculation door 60 provide the controller 48 with signals indicating the position of the recirculation door 60.

The floor outlet 74 includes at least one duct (not shown) that is positioned such that with the blower 58 moving air through the air handler 46, air is directed through duct to a floor area of the passenger compartment 22. The instrument panel outlet 76 includes at least one duct positioned within the instrument panel (dashboard) of the passenger compartment 22. Air moved by the blower 58 out of the instrument panel outlet 76 is directed to a torso or face area of a passenger within the passenger compartment 22. Further, the windscreen outlet 78 includes at least one duct (not shown) that directs air against an inner surface of the windscreen (windshield) of the vehicle 10 in a defrost mode or defog mode.

The airflow door 62 includes a positioning motor 62a controlled by the controller 48. The airflow door 62 is movable to a first position that blocks the windscreen outlet 78 preventing air from blowing out of the air handler 46 and on to the windscreen, and instead allows air from the air handler 46 to exit through the instrument panel outlet 76. The airflow door 62 is also movable to a second position that blocks the instrument panel outlet 76 causing air to flow out of the windscreen outlet 78 on to the windscreen. When the air flow door 62 is in this second position, the air handler 46 is set to the defrost mode or defog mode.

Similarly, the airflow door 64 includes a positioning motor 64a also controlled by the controller 48. The airflow door 64 is movable to a first position that blocks the floor outlet 74 preventing air from blowing out of the air handler 46 and to the floor of the passenger compartment 22, and instead allows air from the air handler 46 to exit through the instrument panel outlet 76. The airflow door 64 is also movable to a second position that blocks the instrument panel outlet 76 causing air to flow out of the floor outlet 74. Hence, using combinations of positions of the airflow door 62 and the airflow door 64, air flow can be directed out of the air handler 46 to any one, any combination of two or all three of the floor outlet 74, the instrument panel outlet 76 and the windscreen outlet 78.

It should be understood from the drawings and the description herein that the controller 48 controls speed and operation of the blower 58 in order to control the flow of air passing through the air handler 46 in response to settings made by a vehicle passenger or the vehicle operator using the display and control panel 34 located within the passenger compartment 22.

Figure 6:
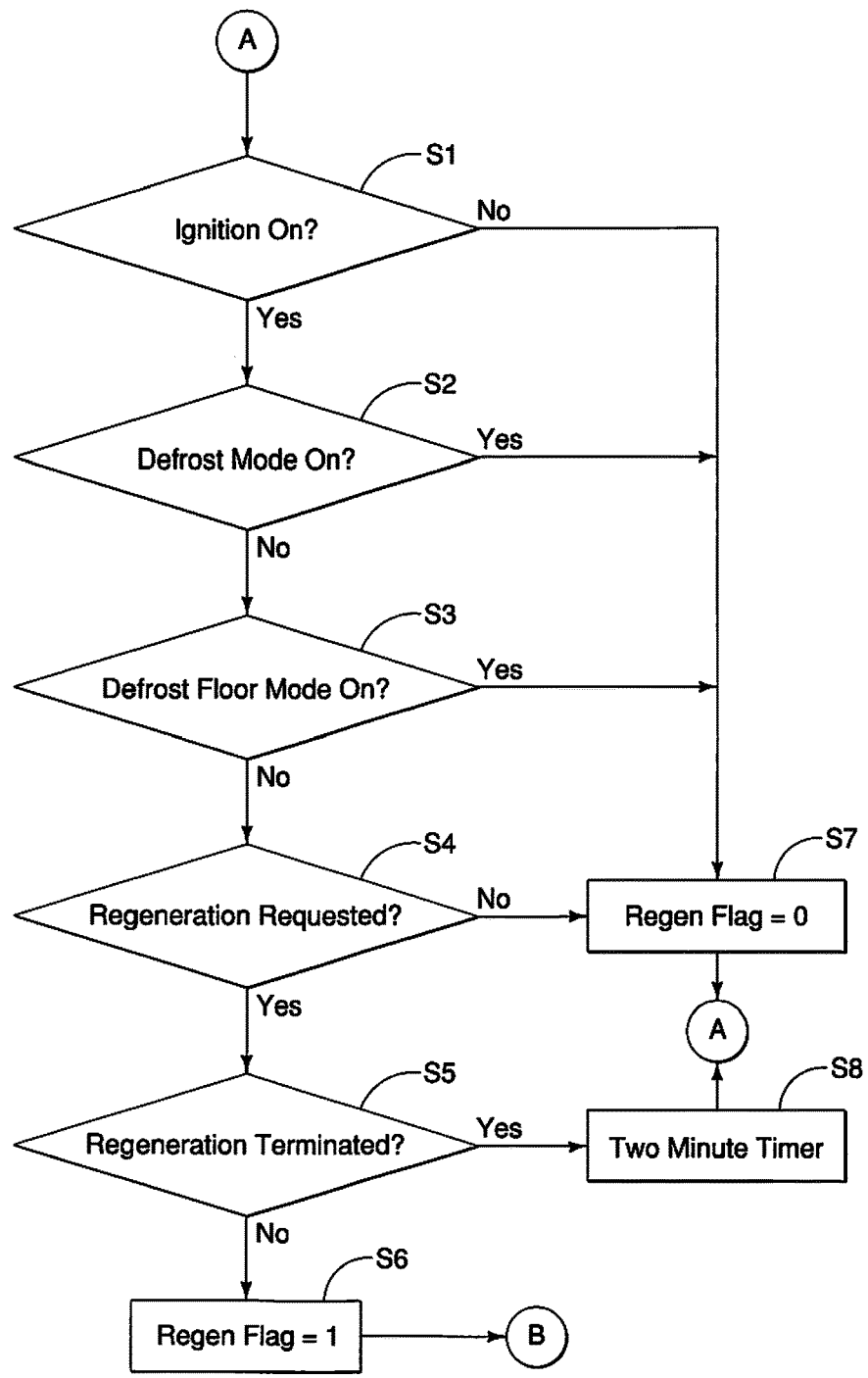
FIG. 6 is a first flowchart showing operational steps of the controller for determining whether or not the recirculation door should be moved from the first position to the second position.
Figure 7:
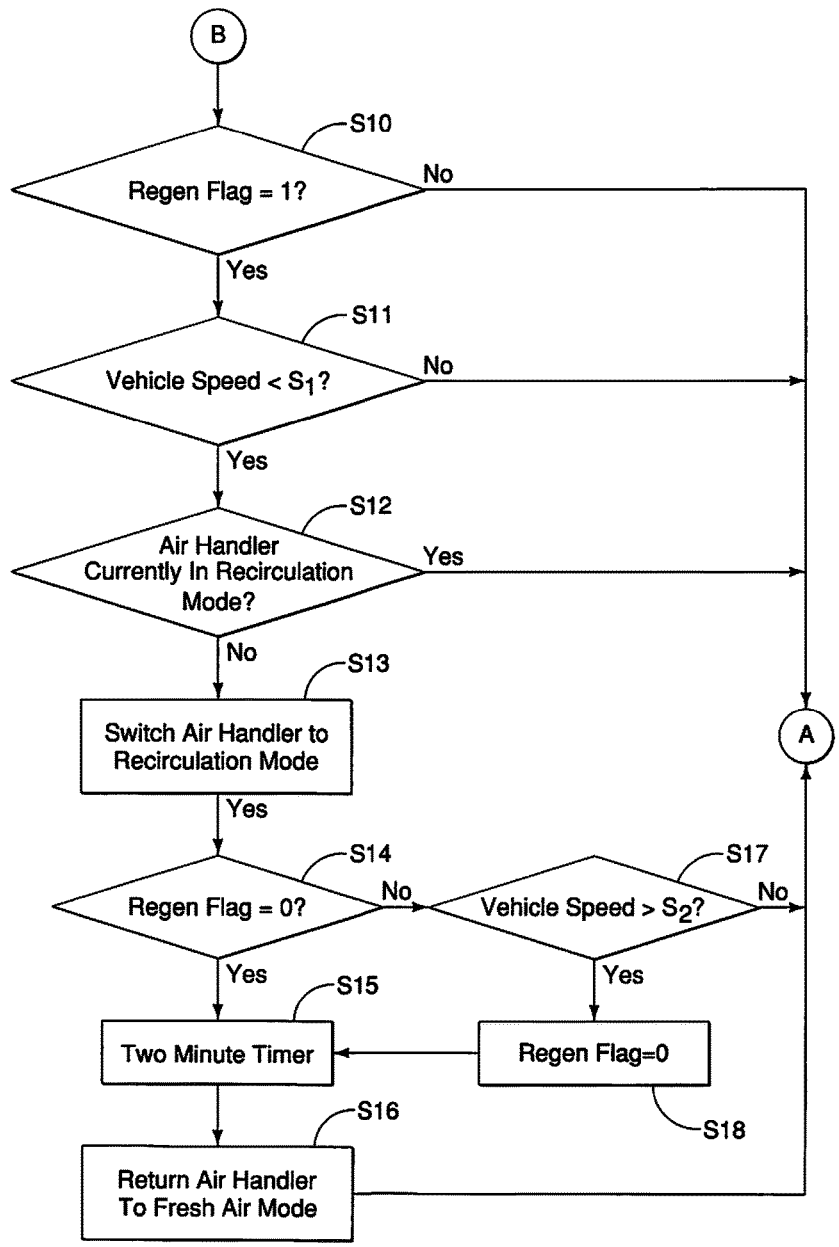
FIG. 7 is a second flowchart showing further operational steps of the controller for moving the recirculation door between the first position and the second position.

A description of operation of the air conditioning system 14 is now provided with reference to FIGS. 6 and 7.

Basically, the controller 48 is configured to change operation of the air handler 46 from a fresh air mode to a recirculation mode in response to determining that the diesel engine 12 is operating in the second operating state (one of the regeneration modes) and that there is a possibility that exhaust gases exiting the particulate collecting mechanism 32 might be drawn in through the fresh air inlet 70 and moved through the air handler 46 into the passenger compartment 22. In other words, depending upon one or more predetermined circumstances including that the diesel engine 12 is about to or has started one of the regeneration processes, the controller 48 can automatically change operation of the air handler 46 from the fresh air mode to the recirculation mode.

The air conditioning system 14 is provided within the vehicle 10 such that the air handler 46 directs movement of air therethrough via the blower 58 in the fresh air mode or the recirculation mode. The controller 48 is provided with signals from the motor 60a of the recirculation door 60 indicating which mode the air handler 46 is operating in. The controller 48 is also provided with signals from the speed sensor 56 indicating current speed of the vehicle 10. The diesel engine controller 30 provides signals to the controller 48 indicating whether or not the diesel engine 12 has switched operation from the first operating state (normal driving operations) to a second operating state (one of the regeneration processes) different from the first operating state. The controller 48 is configured to change operation of the air handler 46 from the fresh air mode to the recirculation mode (via changing the position of the recirculation door 60) in response to signals from the diesel engine controller 30 indicating that the diesel engine 12 has switching from the first operating state (normal operation) to the second operating state (regeneration) with the vehicle 10 moving speed at a speed below a first predetermined speed. The first predetermined speed is, for example, between 20 and 25 miles per hour.

The controller 48 is further configured such that if the air handler 46 is currently operating in a defrost mode in which air exiting the air handler defrosts a predetermined location within the passenger compartment 22, the controller 48 does not change operation of the air handler 46 from the fresh air mode to the recirculation mode in response to the vehicle engine switching from the first operating state to the second operating state. The predetermined location of the defrost mode can be either the windscreen or the floor of the passenger compartment 22. In other words, if the air handler 46 is set to directed air only thru the floor outlet 74, or is set to direct air only through the windscreen outlet 78, then the controller 48 can be configured such that it does not change operation of the air handler 46 from the fresh air mode to the recirculation mode in response to the diesel engine 12 switching from the first operating state to the second operating state.

In the depicted embodiment, the air conditioning system 14 is configured to operate in a manner demonstrated by logic in FIGS. 6 and 7. The logic presented in FIGS. 6 and 7 is just one example of such logic.

In FIG. 6, at step S1, the controller 48 determines whether or not the ignition switch (within the passenger compartment 22) has been turned on or not. If the ignition switch has not been turned on, operation moves to step S7, described further below. At step S2, if the ignition switch has been turned on, operation moves to step S2.

At step S2, the controller 48 determines whether or not the air handler 46 is currently set to operate in the defrost mode (air blowing out of only the windscreen outlet 78). If Yes, then operation moves to step S7, described further below. At step S2, if No, operation moves to step S3.

At step S3, the controller 48 determines whether or not the air handler 46 is currently set to operate in one of the defrost floor mode (air blowing out of only the floor outlet 74). If Yes, then operation moves to step S7, described further below. If No, operation moves to step S4.

At step S4, the controller 48 determines whether or not the regeneration process is in progress. For example, the diesel engine controller 30 can transmit a signal to the controller 48 indicating that either the passive regeneration mode or the first active regeneration process is in progress. At step S4, the controller 48 determines if such a signal has currently been received from the diesel engine controller 30. Further, at step S4, the controller 48 determines whether or not a vehicle operator has pressed a corresponding switch on the display and control panel 34 initiating either the first active regeneration process or the second active regeneration process. Thus, at step S4 the status of the particulate collecting mechanism 32 is determined. At step S4, if a regeneration process is not in progress or has not been requested, operation moves to step S7. At step S4, if a regeneration process is either in progress or has been requested, operation moves to step S5.

At step S5, the controller 48 determines whether or not a currently initiated or currently requested regeneration process has been terminated either by the diesel engine controller 30 or by action of the vehicle operator using the display and control panel 34. At step S5, if no termination of regeneration has been requested, then operation moves to step S6. At step S5, if a termination of regeneration has been requested, then operation moves to step S8, described further below.

At step S6, a variable Regen Flag is made equal to 1, designating that a regeneration process is either in progress or has been requested and will be initiated by the diesel engine controller 30 shortly. After step S6, operations move to the top of FIG. 7, as indicated by the circle B.

At step S7, the variable Regen Flag is made equal to 0, designating that a regeneration process is not in progress, nor has a regeneration process been requested. After step S7, operations return to the top of FIG. 6, as indicated by the circle A.

At step S8 (following the Yes decision made in step S5) a two minute timer is begun. Once the timer has reach a count of two minutes, operations return to the top of FIG. 6, as indicated by the circle A.

In FIG. 7, at step S10, the controller 48 determines whether or not the variable Regen Flag is equal to 1 (one). If No, then operation returns to FIG. 6, as indicated by the circle A. If Yes, then operation moves to step S11.

At step S11, the controller 48 determines whether or not the vehicle speed as measured by the speed sensor 56, is less than a first predetermined determined speed $S_1$. The first predetermined determined speed $S_1$ can vary from vehicle to vehicle. However in the depicted embodiment, the first predetermined determined speed $S_1$ can be set to a fixed value between 5 MPH and 25 MPH. At step S11, if No, then operation returns to FIG. 6, as indicated by the circle A. If Yes, then operation moves to step S12.

At step S12, the controller 48 determines whether or not the air handler 46 is currently set to recirculation mode with the recirculation door 60 covering the fresh air inlet 70. If Yes, then operation returns to FIG. 6, as indicated by the circle A. If No, operation moves to step S13.

At step S13, the controller 48 moves the recirculation door 60 from a position covering the recirculation inlet 72 to a position covering the fresh air inlet 70, thereby allowing air to be drawn into the air handler 46 from the passenger compartment 22 via the recirculation inlet 72.

Next at step S14, the controller 48 determines whether or not variable Regen Flag has been redefined as being equal to 0 (zero). If No, then operation returns to figure moves to step S17 (described below). If Yes, then operation moves to step S15.

At step S15, a two minute timer is begun. Once the timer has reach a count of two minutes, operations move to step S16. At step S16, the controller 48 moves the recirculation door 60 from the position covering the fresh air inlet 70 (the recirculation mode), and moves it to the position covering the recirculation inlet 72 to thereby allowing air to be drawn into the air handler 46 from outside of the vehicle 10 via the fresh air inlet 70 (the fresh air mode).

Thereafter, operation returns to the top of FIG. 6, as indicated by the circle A.

At step S17, the controller 48 determines whether or not the current vehicle speed is greater than a second predetermined speed $S_2$. The second predetermined speed $S_2$ is greater than the first predetermined speed $S_1$. For example, the second predetermined speed $S_2$ at least 25 MPH, but can be as high as 45 MPH. In the depicted embodiment, the second predetermined speed $S_2$ is 35 MPH.

The purpose of the two predetermined speeds $S_1$ and $S_2$, is to take the speed of the vehicle 12 into consideration when switching between the fresh air mode and the recirculation mode. Specifically, at lower speeds (at or below the first predetermined speed $S_1$), there is a possibility that exhaust produced by one of the regeneration processes might enter the passenger compartment 22 via the air handler 46. Therefore, at low speeds, it is desirable to switch the air handler 46 to the recirculation mode. However, once the vehicle 10 achieves speeds at or above the second predetermined speed $S_2$, greater speed of the vehicle 12 cause exhaust produced by one of the regeneration processes to be drawn away from the fresh air inlet 70 of the air handler 46. Therefore, it is acceptable to return to the fresh air mode.

At step S17, if the current vehicle speed is greater than a second predetermined speed $S_2$, then operation moves to step S18. At step S18, the variable Regen Flag is made equal to zero and operation moves to step S15, described above. At step S17, if the current vehicle speed is not greater than a second predetermined speed $S_2$, then operation returns to the top of FIG. 6, as designated by the circle A.

Hence, using the above logic, it is possible to prevent or limit amounts of exhaust produced by one of the regeneration processes from entering the passenger compartment 22 via the air handler 46 by switching to the recirculation mode. Thus, unpleasant odors associated with the gases produced during the regeneration process can be prevented from entering the passenger compartment 22.

As mentioned above, the diesel engine controller 30 and the controller 48 can be a single controller or can be separate controllers that are in electronic communication with one another. Therefore, the operations and functions of each the diesel engine controller 30 and the controller 48 described herein can be built in or programmed into a single controller. Such a single controller (or separated ones of the diesel engine controller 30 and the controller 48) preferably includes a microcomputer with a diesel engine and air conditioning control program that controls the diesel engine 12 and the air conditioning system 14, as discussed below. The controller can also include other conventional components such as an input interface circuit, an output interface circuit, and storage devices such as a ROM (Read Only Memory) device and a RAM (Random Access Memory) device. The memory circuit stores processing results and control programs such as ones for diesel engine regeneration processes operation and air conditioning system operations that are run by the processor circuit. The controller is operatively coupled to the diesel engine 12 and the air conditioning system 14 in a conventional manner. The internal RAM of the controller stores statuses of operational flags and various control data. It will be apparent to those skilled in the art from this disclosure that the precise structure and algorithms for the controller can be any combination of hardware and software that will carry out the functions of the present invention.

The various vehicle elements are conventional components that are well known in the art. Since vehicle elements are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the vehicle with air conditioning system. Accordingly, these terms, as utilized to describe the present invention should be interpreted relative to a vehicle equipped with the vehicle with air conditioning system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle with air conditioning system, comprising:
a diesel engine installed within an engine compartment of the vehicle, the engine being operable in a normal operating state and an active regeneration mode, the diesel engine having an exhaust particulate collection mechanism, the diesel engine being configured to periodically operate in the active regeneration mode in which particulate matter collected within the exhaust particulate collection mechanism is reduced by injecting diesel fuel into exhaust gases entering the exhaust particulate collection mechanism for a predetermined period of time while the vehicle remains stationary;
a vehicle speed sensor configured to measure speed of the vehicle;
an air handler within the vehicle, the air handler defining a fresh air inlet configured to draw fresh air into the air handler from outside the vehicle body structure, a plurality of air outlets configured to direct air out of the air handler into the passenger compartment and a recirculation inlet configured to draw air from within the passenger compartment into the air handler, the air handler being configured to operate in a fresh air mode and a recirculation mode, such that in the fresh air mode fresh air enters the air handler through the fresh air inlet and in the recirculation mode fresh air is prevented from entering the air handler and air instead enters the air handler via the recirculation inlet, the air handler further includes at least one defrost air outlet that directs air to a predetermined location within the passenger compartment, the air handler being further configured operate in a defrost mode in which at least a portion of air within the air handler is diverted to direct air out of the at least one defrost air outlet to the predetermined location within the passenger compartment; and
a controller coupled to the engine, the vehicle speed sensor and the air handler, the controller being configured such that in response to determining the following, that:
1) the engine has switched from operating in the normal operating state to operating in the active regeneration mode;
2) the air handler is currently operating in the fresh air mode,
3) the vehicle body structure is stationary; and
4) the air handler is not operating in the defrost mode, the air handler is switched to operate in the recirculation mode;
wherein the controller is configured such that after switching the air handler to operate in the active recirculation mode, the controller returns the air handler to operate in the fresh air mode in response to determining that the vehicle body structure is moving.

2. A vehicle with an air conditioning system, comprising:
a vehicle body structure defining a passenger compartment and an engine compartment;
a vehicle speed sensor configured to measure speed of the vehicle body structure;
a diesel engine installed within the engine compartment and having an exhaust particulate collection mechanism, the diesel engine being configured to periodically operate in an active regeneration mode in which particulate matter collected within the exhaust particulate collection mechanism is reduced by injecting diesel fuel into exhaust gases entering the exhaust particulate collection mechanism for a predetermined period of time while the vehicle remains stationary;
an air handler within the vehicle body structure and having a fresh air inlet configured to draw fresh air into the air handler from outside the vehicle body structure, a plurality of air outlets configured to direct air out of the air handler into the passenger compartment and a recirculation inlet configured to draw air from within the passenger compartment into the air handler, the air handler being configured to operate in a fresh air mode and a recirculation mode, such that in the fresh air mode fresh air enters the air handler through the fresh air inlet and in the recirculation mode fresh air is prevented from entering the air handler and air instead enters the air handler via the recirculation inlet, the air handler further includes at least one defrost air outlet that directs air to a predetermined location within the passenger compartment, the air handler being further configured operate in a defrost mode in which at least a portion of air within the air handler is diverted to direct air out of the at least one defrost air outlet of the air handler to the predetermined location within the passenger compartment; and
a controller coupled to the vehicle speed sensor, the diesel engine and the air handler, the controller being configured such that in response to determining that:
1) the diesel engine is operating in the regeneration mode;
2) the air handler is operating in the fresh air mode;
3) the vehicle body structure is stationary; and
4) the air handler is not operating in the defrost mode,
the air handler is switched to operate in the recirculation mode;
wherein the controller is configured such that after switching the air handler to operate in the active recirculation mode, the controller returns the air handler to operate in the fresh air mode in response to determining that the vehicle body structure is moving.

3. The vehicle with air conditioning system according to claim 2, wherein
the air handler includes a door configured to move between a first position and a second position, such that in the first position the air handler operates in the fresh air mode and in the second position the air handler operates in the recirculation mode.

4. The vehicle with air conditioning system according to claim 2, wherein
the diesel engine includes a sensor that detects whether or not the diesel engine is operating in the active regeneration mode, and the controller is connected to the sensor of the diesel engine receiving operation status signals therefrom.

5. The vehicle with air conditioning system according to claim 2, wherein
the controller is configured such that after switching the air handler to operate in the recirculation mode, the controller returns the air handler to operate in the fresh air mode in response to passage of the predetermined period of time.

6. A method, comprising:
providing a vehicle body structure with an air conditioning system that includes an air handler that directs movement of air therethrough in a fresh air mode and a recirculation mode, such that in the fresh air mode fresh air enters the air handler from outside the vehicle body structure through a fresh air inlet and is directed into a passenger compartment within the vehicle body structure, and in the recirculation mode fresh air is prevented from entering the air handler via the fresh air inlet and instead air enters the air handler via a recirculation inlet from the passenger compartment, the air conditioning system being further configured such that the air handler is operable in a defrost mode in which air exiting the air handler defrosts a predetermined location within the passenger compartment;
providing signals to a controller of the air conditioning system indicating the air handler is operating in the fresh air mode;
providing signals to the controller indicating current speed of the vehicle body structure;
providing signals to the controller indicating that a vehicle engine has switched operation from a normal operating state to an active regeneration mode in which the vehicle remains; and
having the controller change operation of the air handler from the fresh air mode to the recirculation mode in response to the vehicle engine switching from the normal operating state to the active regeneration mode, and the air handler not currently operating in the defrost mode, and
in the providing of signals to the controller, while operating in the active regeneration mode for a predetermined period of time the diesel engine injects fuel into exhaust gases entering an exhaust particulate collection mechanism of the diesel engine reducing particulate matter collected therein;
wherein the having the controller change operation of the air handler from the fresh air mode to the recirculation mode includes the controller switching the air handler from the recirculation mode to the fresh air mode in response to determining that the vehicle body structure is in motion.

7. The method according to claim 6, wherein
the having the controller change operation of the air handler from the fresh air mode to the recirculation mode includes the controller returning the air handler to the fresh air mode in response to passage of the predetermined period of time.

* * * * *